(12) United States Patent
Cheimets (10) Patent No.: US 7,961,224 B2
(45) Date of Patent: Jun. 14, 2011

(54) PHOTON COUNTING IMAGING SYSTEM (75) Inventor: Peter N. Cheimets, Winchester, MA (US)

(73) Assignee: Peter N. Cheimets, Winchester, MA (US)

( * ) Notice: Subject to any disclaimer, the term of this patent is extended or adjusted under 35 U.S.C. 154(b) by 695 days.

(21) Appl. No.: 12/020,453

(22) Filed: Jan. 25, 2008

(65) Prior Publication Data
US 2009/0190001 A1 Jul. 30, 2009

(51) Int. Cl.
H04N 5/228 (2006.01)
G06K 9/40 (2006.01)

(52) U.S. Cl. .................... 348/222.1; 382/255

(58) Field of Classification Search ............ 348/231.99, 348/222.1, 234, 47–48; 382/255, 263, 264
See application file for complete search history.

(56) References Cited

U.S. PATENT DOCUMENTS

| | | |
|---|---|---|
| 2,143,060 A | 1/1939 | Dzialoschinsky et al. |
| 2,838,442 A | 6/1958 | McMaster |
| 2,876,161 A | 3/1959 | Gieschi |
| 3,495,086 A | 2/1970 | Scott, Jr. |
| 4,381,293 A | 4/1983 | Michel |
| 4,476,494 A | 10/1984 | Tugaye |
| 4,673,276 A | 6/1987 | Yoshida |
| 4,692,007 A | 9/1987 | Vogt |
| 4,817,038 A | 3/1989 | Knoll |
| 4,844,890 A | 7/1989 | Suskin |
| 4,979,221 A | 12/1990 | Perryman |
| 4,994,265 A | 2/1991 | White |
| 5,034,220 A | 7/1991 | Helioff |
| 5,066,970 A | 11/1991 | Kakita |
| 5,107,293 A | 4/1992 | Sekine |
| 5,122,827 A | 6/1992 | Saegusa |
| 5,174,992 A | 12/1992 | Lindauer |
| 5,209,925 A | 5/1993 | Lindauer |
| 5,243,433 A | 9/1993 | Hailey |
| 5,251,037 A | 10/1993 | Busenberg |
| 5,258,795 A | 11/1993 | Lucas |
| 5,359,363 A | 10/1994 | Kuban |
| 5,442,462 A | 8/1995 | Guissin |
| 5,502,482 A | 3/1996 | Graham |
| 5,511,153 A | 4/1996 | Azarbayejani |

(Continued)

OTHER PUBLICATIONS

Papaliolios, Costas; Nisenson, Peter; and Ebstein, Steven; "Speckle imaging with the PAPA detector"; Jan. 15, 1985, vol. 24, No. 2/ Applied Optics, 287-292.

(Continued)

Primary Examiner — Nhan T Tran
Assistant Examiner — Trung Diep
(74) Attorney, Agent, or Firm — Sampson & Associates, P.C.

(57) ABSTRACT

An imaging device includes first and second photon sensors respectively capture arrival times and locations of individual photons on first and second image planes, while optionally capturing photon colors. A stereoptic distance finder identifies source distance of image elements common to both image planes, while a processor correlates the identified source distances to photons within the image elements. A memory stores the arrival times and locations, the color, and the identified source distances. An orientation sensor captures photon sensor orientation in six degrees of freedom. An image processor selects a time span, identifies photons captured within the time span, defines an image field, divides the image field into virtual pixels, and aggregates the colors of photons arriving within each virtual pixel within the time frame, to determine a color and intensity of the virtual pixel. The image processor also aggregates the virtual pixels to generate an image file.

23 Claims, 6 Drawing Sheets

U.S. PATENT DOCUMENTS

| | | | |
|---|---|---|---|
| 5,515,453 A | 5/1996 | Hennessey | |
| 5,541,697 A | 7/1996 | McIntyre | |
| 5,561,498 A | 10/1996 | Sekine | |
| 5,563,650 A | 10/1996 | Poelstra | |
| 5,586,231 A | 12/1996 | Florent | |
| 5,665,959 A | 9/1997 | Fossum | |
| 5,671,264 A | 9/1997 | Florent | |
| 5,692,062 A | 11/1997 | Lareau | |
| 5,694,491 A | 12/1997 | Brill | |
| 5,754,225 A | 5/1998 | Naganuma | |
| 5,757,011 A | 5/1998 | Whitebook | |
| 5,771,317 A | 6/1998 | Edgar | |
| 5,794,078 A | 8/1998 | Okazaki | |
| 5,832,139 A | 11/1998 | Batterman | |
| 5,892,541 A | 4/1999 | Merrill | |
| 5,903,782 A | 5/1999 | Oxaal | |
| 5,912,993 A | 6/1999 | Puetter | |
| 5,920,319 A | 7/1999 | Vining | |
| 5,949,914 A | 9/1999 | Yuen | |
| 5,987,136 A | 11/1999 | Schipper | |
| 6,018,365 A | 1/2000 | Merrill | |
| 6,031,941 A | 2/2000 | Yano | |
| 6,057,539 A | 5/2000 | Zhou | |
| 6,075,889 A | 6/2000 | Hamilton | |
| 6,084,227 A | 7/2000 | Rhoads | |
| 6,094,215 A | 7/2000 | Sundahl | |
| 6,108,032 A | 8/2000 | Hoagland | |
| 6,192,196 B1 | 2/2001 | Keller | |
| 6,195,122 B1 | 2/2001 | Vincent | |
| 6,198,505 B1 * | 3/2001 | Turner et al. | 348/222.1 |
| 6,208,765 B1 | 3/2001 | Bergen | |
| 6,219,492 B1 | 4/2001 | Maehama | |
| 6,222,583 B1 | 4/2001 | Matsumura | |
| 6,249,616 B1 | 6/2001 | Hashimoto | |
| 6,278,460 B1 | 8/2001 | Myers | |
| 6,282,362 B1 | 8/2001 | Murphy | |
| 6,285,804 B1 | 9/2001 | Crinon | |
| 6,292,215 B1 | 9/2001 | Vincent | |
| 6,297,825 B1 | 10/2001 | Madden | |
| 6,320,928 B1 | 11/2001 | Vaillant | |
| 6,335,987 B1 | 1/2002 | Yoon | |
| 6,343,187 B1 | 1/2002 | Sato | |
| 6,344,640 B1 | 2/2002 | Rhoads | |
| 6,359,617 B1 | 3/2002 | Xiong | |
| 6,373,518 B1 | 4/2002 | Sogawa | |
| 6,396,961 B1 | 5/2002 | Wixson | |
| 6,404,843 B1 | 6/2002 | Vaillant | |
| 6,434,265 B1 | 8/2002 | Xiong | |
| 6,441,848 B1 | 8/2002 | Tull | |
| 6,445,814 B2 | 9/2002 | Iijima | |
| 6,473,122 B1 | 10/2002 | Kanekal | |
| 6,489,992 B2 | 12/2002 | Savoye | |
| 6,549,651 B2 | 4/2003 | Xiong | |
| 6,552,744 B2 | 4/2003 | Chen | |
| 6,553,138 B2 | 4/2003 | Rozin | |
| 6,597,406 B2 | 7/2003 | Gloudemans | |
| 6,642,495 B2 | 11/2003 | Lowrance | |
| 6,643,408 B2 | 11/2003 | Kobayashi | |
| 6,650,789 B2 | 11/2003 | Edgar | |
| 6,690,838 B2 | 2/2004 | Zhou | |
| 6,766,053 B2 | 7/2004 | Fan | |
| 6,788,338 B1 * | 9/2004 | Dinev et al. | 348/222.1 |
| 6,856,350 B2 | 2/2005 | Orava | |
| 6,876,775 B2 | 4/2005 | Torunoglu | |
| 6,895,126 B2 | 5/2005 | Bernardo | |
| 6,901,173 B2 | 5/2005 | Alderson | |
| 6,907,139 B2 * | 6/2005 | Yamamoto | 382/154 |
| 6,922,210 B2 | 7/2005 | Yang | |
| 6,943,831 B2 | 9/2005 | Gallagher | |
| 6,950,562 B2 | 9/2005 | Rouvellou | |
| 6,959,117 B2 | 10/2005 | Ratner | |
| 6,973,220 B2 | 12/2005 | Sakurai | |
| 6,990,252 B2 | 1/2006 | Shekter | |
| 7,013,025 B2 | 3/2006 | Hiramatsu | |
| 7,050,091 B2 | 5/2006 | Tull | |
| 7,116,359 B2 | 10/2006 | Kitamura | |
| 7,123,779 B2 | 10/2006 | Beuker | |
| 7,194,112 B2 | 3/2007 | Chen | |
| 7,257,270 B2 | 8/2007 | Yamaguchi | |
| 2001/0008418 A1 | 7/2001 | Yamanaka | |
| 2001/0019634 A1 | 9/2001 | Lainema | |
| 2002/0054223 A1 | 5/2002 | Spriggs | |
| 2002/0060736 A1 | 5/2002 | Wakao | |
| 2002/0071677 A1 | 6/2002 | Sumanaweera | |
| 2002/0089595 A1 | 7/2002 | Orava | |
| 2002/0118883 A1 | 8/2002 | Bhatt | |
| 2002/0130953 A1 | 9/2002 | Riconda | |
| 2002/0154240 A1 | 10/2002 | Tamai | |
| 2002/0191083 A1 * | 12/2002 | Akiyoshi et al. | 348/222.1 |
| 2007/0030363 A1 * | 2/2007 | Cheatle et al. | 348/239 |

OTHER PUBLICATIONS

Lawson, Peter R.; "The Sydney University PAPA Camera"; Proceedings ASA, 1994, 11 (2) 50-54.

Papaliolios C.; Mertz L.; "New two-dimensional photon camera"; 1982, Instrumentation in Astronomy IV, Proc. SPIE vol. 331, pp. 360-364 (1982). 1982 SPIE.

Morel, S. and Koechlin, L.; "The DELTA photon counting camera concept"; Astronomy & Astrophysics Supplement Series 130, Jun. 1, 1998; pp. 395-401.

* cited by examiner

**PHOTON INFORMATION
(IN COMPUTER MEMORY)** 32

| ARRIVAL TIME | X | Y | COLOR | DISTANCE |
|---|---|---|---|---|
|  |  |  |  |  |
|  |  |  |  |  |
|  |  |  |  |  |

**CAMERA ORIENTATION INFORMATION
(IN COMPUTER MEMORY)** 34

| TIME | $\delta X$ | $\delta Y$ | $\delta Z$ | $\delta\Theta x$ | $\delta\Theta y$ | $\delta\Theta z$ |
|---|---|---|---|---|---|---|
|  |  |  |  |  |  |  |
|  |  |  |  |  |  |  |
|  |  |  |  |  |  |  |

PHOTON COUNTING IMAGING SYSTEM

BACKGROUND

1. Technical Field

This invention relates to an imaging system and method which captures arrival time and position information associated with each photon of an incoming photon stream, for use in image construction.

2. Background Information

In conventional photography, an image is recorded by opening the shutter for a predetermined length of time, and accumulating all the light that passes through an aperture onto a photosensitive surface such as conventional photographic film. More recent approaches use arrays of CCD pixels as the photosensitive surface, to generate digital images. Although the use of surfaces such as CCD arrays may represent improvements relative to chemical-based photographic film, both approaches are subject to many of the same drawbacks. For example, both processes are subject to issues such as overexposure, underexposure, and blurring due to excessive camera movement relative to shutter speed. Once the image is recorded using these conventional approaches, there is little that may be done to adjust for these issues, particularly with respect to blurring.

U.S. Pat. No. 5,912,993 (the '993 patent) and U.S. Pat. No. 6,018,365 (the '365 patent) both of which are fully incorporated herein by reference, disclose techniques for generating an image based on individually read CCD pixels. These approaches use image position information inferred from CCD pixel position to generate the final image. The image reconstruction technique of the '993 patent works by looking for an underlying configuration of "pixons" that best fits the original, noisy and distorted, image, but with the noise and distortion removed. This method operates on an already captured image.

In the '365 patent, the CCD is read out many times, clearing out the charge building up in the pixels, over an interval that would otherwise over-expose the CCD. In doing so, the process keeps the over-exposed pixels from "blooming" out and bleeding into the image in the surrounding pixels. This is thought to facilitate an increase in the contrast range of the CCD, e.g., to permit the photographing of scenes with large differences between areas of light and dark (e.g. as occurs at sunset, or headlights at dusk). Once these sub-images are collected, an image may be constructed.

While these patents may address some of the aforementioned drawbacks, there remain a number of unresolved issues, such as those associated with blurring due to camera movement.

SUMMARY

According to one aspect of the invention, an imaging device includes first and second apertures respectively associated with first and second image planes. A first photon sensor is configured to capture arrival times and locations of individual photons on the first image plane, and second photon sensors are configured to capture arrival times and locations of individual photons on the second image plane. The second photon sensors are also configured to capture colors of the photons on the second image plane. A stereoptic distance finder is configured to identify source distance of image elements common to the first and second image planes, while a processor is configured to correlate the identified source distances to photons within the image elements. A memory is configured to store the arrival times and locations, the color, and the identified source distances of the photons. An orientation sensor coupled to at least one of the photon sensors is configured to capture orientation in six degrees of freedom. An image processor is configured to select a time span, identify photons captured within the time span, define an image field, divide the image field into virtual pixels, and aggregate the colors of photons arriving within each virtual pixel within the time frame, to determine a color and intensity of the virtual pixel. The image processor is also configured to aggregate the virtual pixels disposed within the image field, to generate an image file of the virtual pixels.

In another aspect of the invention, an imaging device includes an aperture defining an image plane, and a photon sensor configured to detect the arrival locations and times of individual photons thereon. An orientation sensor is configured to detect the orientation of the photon sensor. A processor is configured to capture the orientation, and the photon arrival locations and times, while a memory device is configured to store the orientation, arrival locations and arrival times. The processor is configured to select a time span, identify photons captured within the time span, define an image field corresponding to the image plane, divide the image field into virtual pixels, and aggregate the photons arriving within each virtual pixel within the time frame, to determine intensity of the virtual pixel. The processor is also configured to aggregate the virtual pixels disposed within the image field, to generate an image file of the virtual pixels.

In still another aspect, a method for imaging includes detecting, with a photon sensor, arrival locations and arrival times of individual photons on an image plane, while detecting, with an orientation sensor, the orientation of the photon sensor. The method also includes capturing and storing, with a processor and memory, the arrival locations and arrival times, selecting a time span, identifying photons captured within the time span, defining an image field, and dividing the image field into virtual pixels. The photons arriving within each virtual pixel within the time frame are aggregated to determine intensity of the virtual pixel. The virtual pixels disposed within the image field are aggregated to generate an image file of the virtual pixels.

According to yet another aspect of the invention, an imaging device includes first and second apertures associated with first and second image planes, and first and second photon sensors respectively configured to capture arrival locations and times of individual photons on the image planes. A stereoptic distance finder is configured to identify source distance of image elements common to the first and second image planes. A processor is configured to correlate the identified source distances to photons within the image elements. A memory is configured to store the arrival times and arrival locations, and the identified source distances. An image processor is configured to select a time span, identify photons captured within the time span, define an image field, divide the image field into virtual pixels, and aggregate the colors of photons arriving within each virtual pixel within the time frame, to determine an intensity of the virtual pixel. The image processor is also configured to aggregate the virtual pixels disposed within the image field, to generate an image file of the virtual pixels.

The features and advantages described herein are not all-inclusive and, in particular, many additional features and advantages will be apparent to one of ordinary skill in the art in view of the drawings, specification, and claims. Moreover, is should be noted that the language used in the specification has been principally selected for readability and instructional purposes, and not to limit the scope of the inventive subject matter.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Embodiments of the present invention use imaging approaches that are distinct from conventional photography. Instead of simply integrating all the light that is received through an aperture during a predetermined length of time (i.e., based on shutter speed), these embodiments record photons individually as they arrive through one or more apertures. The arrival time and location at one or more focal (image) planes, and optionally, the color of the photons, (collectively, 'photon stream' information) is captured and stored in a database. In addition, time-based information on the camera orientation may also be recorded. The combination of photon stream information and camera orientation may then be used to perform post-data collection image construction.

This captured information may then be used to selectively place individual photons into an image file to build a picture. For example, by varying the time span over which photons are selected, the overall image exposure may be adjusted. This approach is analogous to setting the shutter speed in a conventional camera. However, with conventional photography, if the shutter timing was incorrect, then there is little one can do to compensate, and the image of the event may be effectively lost. On the other hand, embodiments of the present invention enable the photons from the event to be adjusted, such as by using greater or fewer of them, to improve the final image, so that the image of the event is not lost.

In addition, since the camera orientation, as a function of time, may be recorded, the effects of camera motion may be removed, such as to reduce image blur that may otherwise result therefrom. This may be effected by generating a motion history of the photon sensor throughout the recording period (or selected time interval). The photon sensor motion history may then be used to adjust the measured photon arrival location to another position. The adjusted position(s) is the location at which each of the photons within the selected time interval would have arrived, but for the movement of the photon sensor. Once the adjustments are made, the image reconstruction may proceed as described above.

Moreover, since the photon information may be optionally captured using two (or more) apertures, the distance to the photon source may be inferred stereoptically. This distance information may also be used during image construction, such as to apply various effects conventionally associated with a lens, such as f-stop (depth of field), and lens design effects (panoramic, fish-eye, etc.), even though these embodiments do not require use of a lens.

Thus, as described herein, during image construction, photons may be sorted and treated selectively, based not only on the timing of photon arrival and camera/sensor movement, but also on the distance to the photon source, to permit complex, post-data collection lighting, position, and exposure control.

As used in this document, the term "computer" is meant to encompass a workstation, person computer, personal digital assistant (PDA), wireless telephone, or any other suitable computing device.

Programming Languages

Embodiments of the present system may be programmed in any suitable language and technology, including, but not limited to: C++; Visual Basic; Java; VBScript; Jscript; BCMAscript; DHTM1; XML and CGI. Any suitable database technology may be employed, but not limited to: Microsoft Access and IMB AS 400.

Referring now to the Figures, representative embodiments of the present invention will be more thoroughly described.

Figure 1:
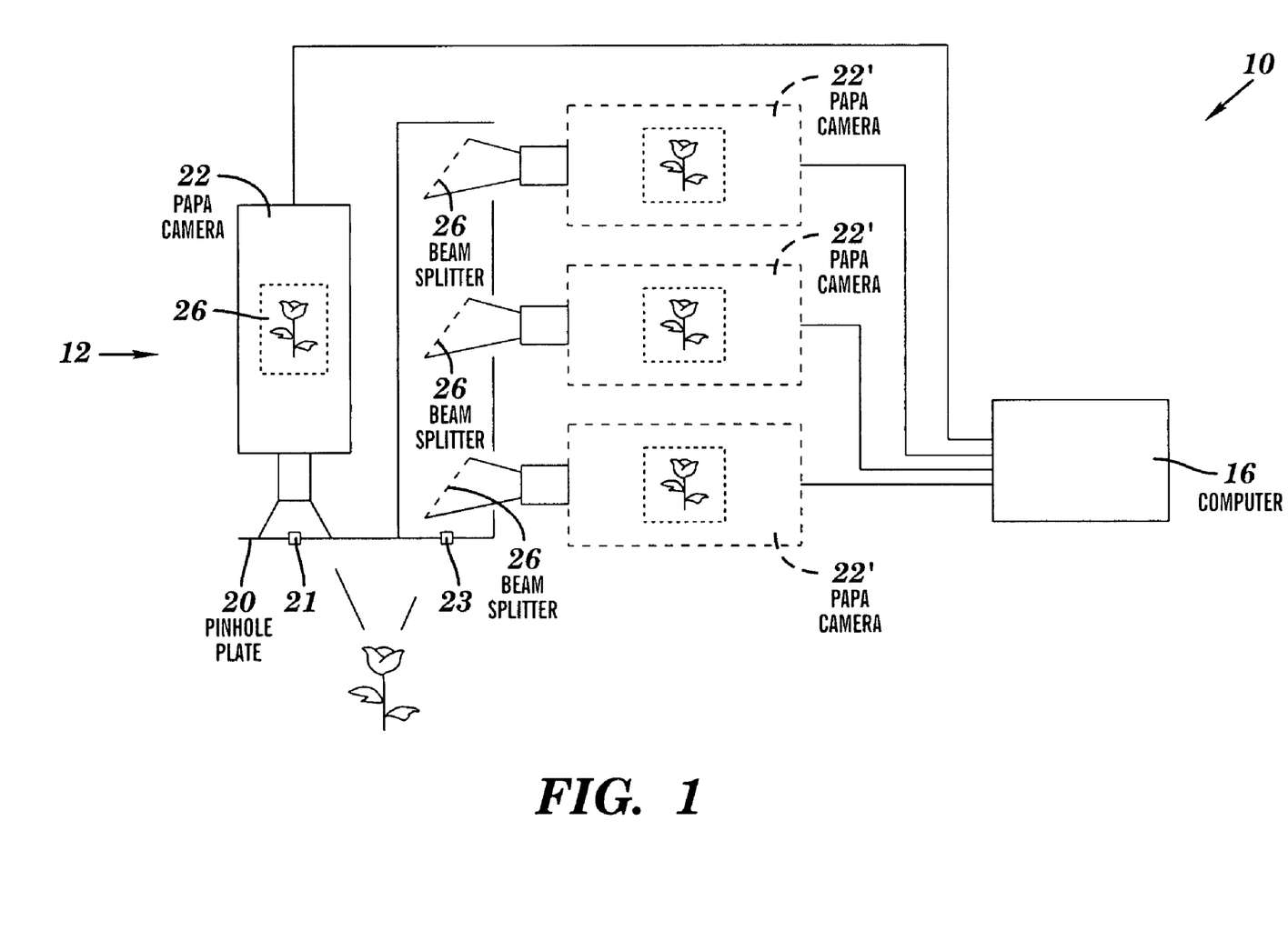
FIG. 1 is a block diagram of a representative embodiment of an imaging system of the present invention, with optional portions shown in phantom.

Turning to FIG. 1, in one embodiment, an imaging system 10 is configured to implement a two-stage imaging process. In the first stage, image data collection is performed using one or more photon imagers. In the second stage, image construction is performed substantially within a conventional computer environment. As shown, imaging system 10 includes a photon imager 12, an optional orientation sensor 14 (FIG. 2) and a device such as computer 16, for capturing and recording output from imager 12.

Photon Imager

Figure 3:
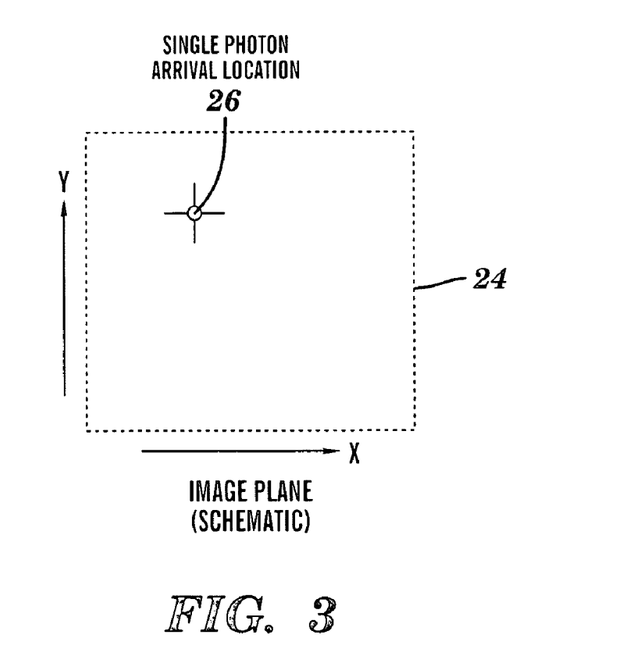
FIG. 3 is a view, on an enlarged scale, of a representative image plane of the embodiments of FIGS. 1 and 2.

The photon imager 12 includes a pin-hole aperture plate 20. Behind a pin-hole aperture 21 in the plate is a photon sensor 22 which defines an image plane 24 (FIG. 3). Sensor 22 detects the arrival of a photon through pin-hole 21, including its arrival location 26 within the image plane 24 (FIG. 3), the time of its arrival, and optionally, its color, as will be discussed in greater detail hereinbelow. This information is captured and stored by computer 16 for later retrieval.

Any suitable device, either currently available or as may be developed in the future, may be used for photon sensor 22. One suitable device is a conventional PAPA (Precision Analog Photon Address) Camera. Although conventional PAPA Cameras tend to be optimized for relatively low light applications, it is expected that these, and similar devices, may be optimized for higher light applications in the future. It should be recognized that the embodiments disclosed herein may use sensors 22 optimized for either relatively low light or higher light conditions, depending on the particular application, without departing from the scope of the present invention.

In the particular embodiment shown, the single PAPA camera 22 is sensitive to photon arrival and location, but not color. It is disposed in image-capturing relation behind the aperture 21, to record the arrival time and location of each incoming photon. This configuration may be used for black and white image capture and generation, as will be discussed in greater detail hereinbelow.

Optionally, camera 22 may be used in combination with one or more additional photon sensors 22', to enable the post-processing system 16 to infer the source distance of incoming photons, and/or to capture color information. For example, stereoptic techniques may be used in combination with camera 22 and at least one camera 22' disposed behind a second aperture 23, to infer source distance information, as will be discussed in greater detail hereinbelow. Moreover, an array of nominally monochromatic photon sensors 22' may be disposed to capture color information. In this regard, three co-mounted PAPA cameras 22' may each be fed with a portion of the light arriving through the second aperture 23 of plate 20. This incoming light may then be split by color, such as by use of conventional beam splitters 26, into desired spectral intervals. In the example shown, three spectral intervals, i.e., red, green, and blue, are used, with red light sent to one, green to another, and blue to the third sensor 22'. (It should be noted that greater or fewer spectral intervals may be used, without departing from the scope of the invention.) Thus, in this embodiment, each photon arriving through aperture 23 is directed to one of the detectors 22'. The resulting photon arrival information for each detector 22' (and 22) may then be stored or otherwise aggregated within a memory associated with computer 16, such as in a database or table 32 (FIG. 4), along with the portion of the visible spectrum (e.g., color) from which it came. One or more tables 32, e.g., associated with one or more databases or other memory devices, may be used without departing from the instant invention.

In addition to the photon arrival times, locations, and optional color information, as mentioned above, the data stored in table 32 may also include distance information. This distance information may be inferred over multiple steps, such as discussed with respect to the following Table I.

TABLE I

| 200 | Build two preliminary images using steps 210-222 below |
| 202 | Stereoptically determine distance to elements within images |
| 204 | Associate distance with individual photons |

In various embodiments, the data aggregation process may include building 200 at least two preliminary images, e.g., one from each channel (aperture) 21, 23, such as described in steps 210-222 below. For example, the preliminary image 26 derived from data associated with aperture 21 (and sensor 22) may be black and white, while the image associated with aperture 23 (and sensors 22') may either be black and while, or may be a combination of the monochromatic images 26' of each sensor 22', to produce a color image. Alternatively, both preliminary images may be in color, such as by providing both apertures/channels 21, 23, with multiple sensors 22' as shown with channel 23, or by providing each channel with a single camera capable of capturing color information.

Figure 4:
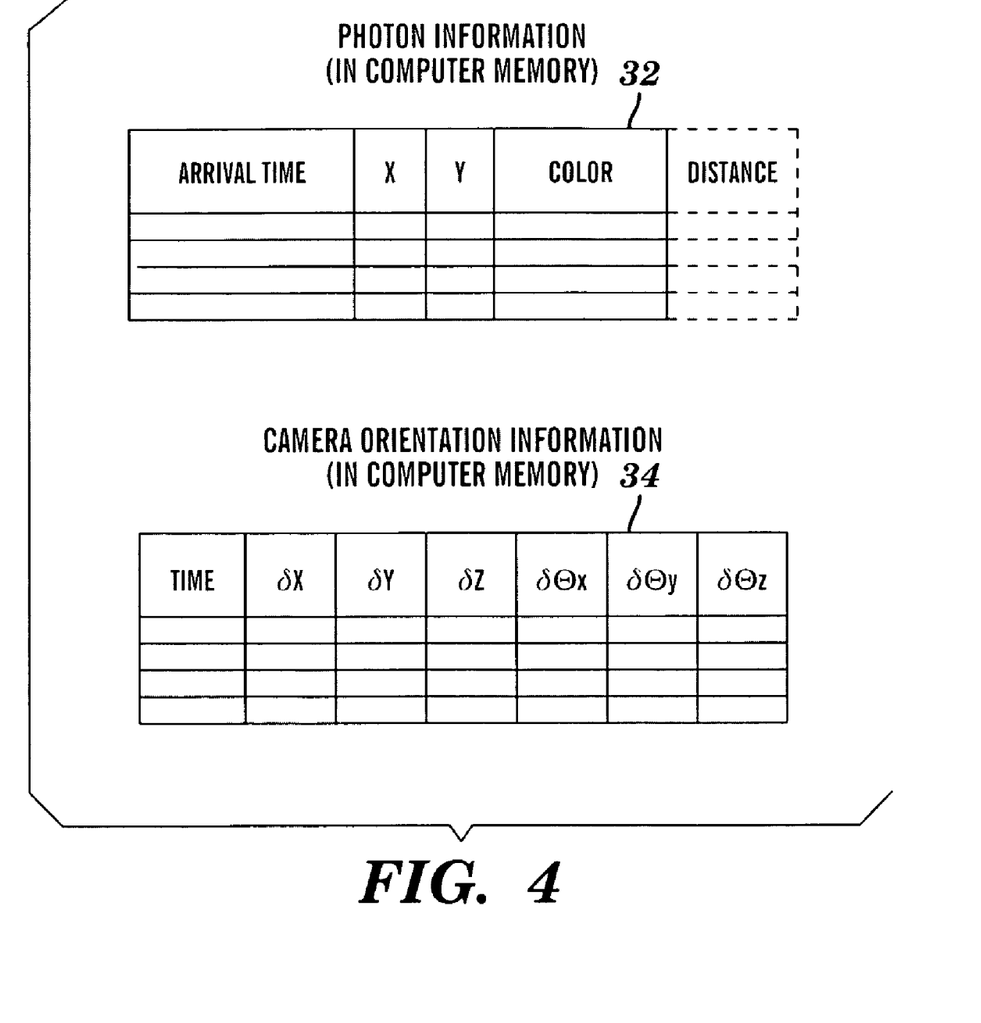
FIG. 4 is a table of representative information stored by the embodiments of FIGS. 1 and 2.

With the two preliminary images, conventional stereoptical techniques may be used to identify 202 the source distance of elements common to both images. One exemplary stereoptical technique that may be used in embodiments of the present invention is disclosed in U.S. Pat. No. 7,203,356, which is fully incorporated by reference herein. Since the elements of each preliminary image are constructed using the photon information gathered by the sensors 22, 22', the distance information obtained for these particular image elements may be conveniently associated 204 with the photon information comprising those elements, e.g., by writing to table 32 (FIG. 4). Thus tagged, each photon may be filtered and/or processed based on its source location in 3 dimensions relative to the position of the image sensor(s) 22, 22' during subsequent image construction as discussed hereinbelow.

Orientation Sensor

Figure 2:
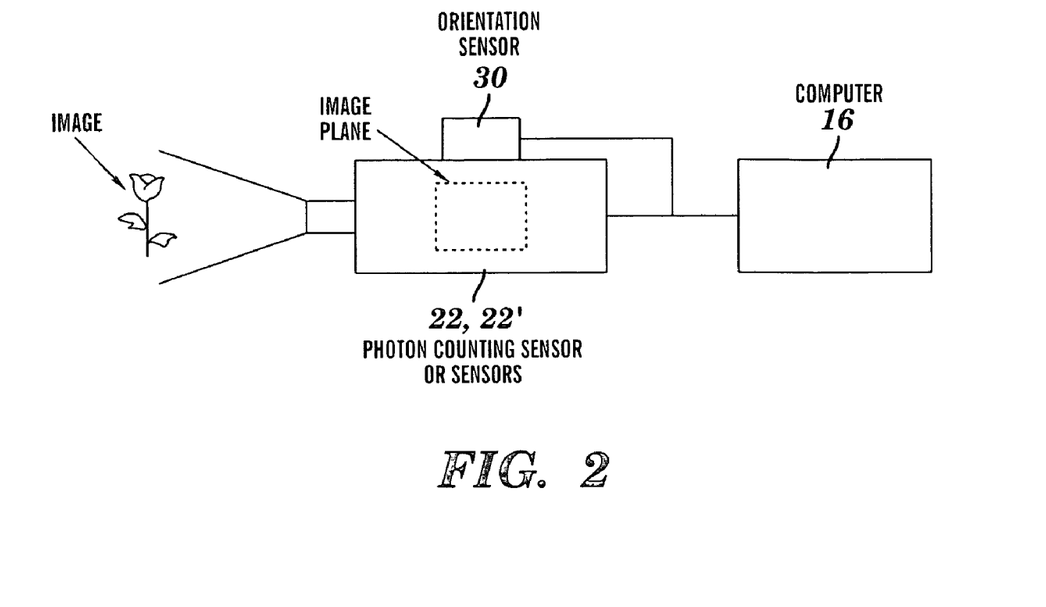
FIG. 2 is a schematic, elevational side view of an alternate embodiment of the present invention.

With reference now to FIG. 2, the various embodiments described herein may optionally include an orientation sensor 30 mounted to the photon sensor 22, 22', to track the movement of the photon sensor(s) 22, 22', during photon capture (recording). In particular embodiments, the orientation sensor 30 tracks the changes in the orientation of sensor(s) 22, 22' in 6 degrees of freedom: i.e., translation along three axes (x, y and z), and rotation about these axes ($\Theta x$, $\Theta y$, and $\Theta z$), although fewer degrees of freedom may be captured if desired. Any number of devices may be used for orientation sensor 30, including various combinations of accelerometers, gyroscopes, or other inertial sensing devices. Moreover, direct measurement devices may be used, such as laser range finders and/or satellite-based global positioning systems (e.g., GPS or GLONASS). In representative embodiments, orientation sensor 30 may include accelerometers, such as a pair of dual-axis accelerometers (e.g., ADXL320 accelerometers available from Analog Devices, Inc., Norwood, Mass.), and/or an inertial sensor such as the IS-900 Precision Motion Tracker™ (InterSense, Inc., Bedford, Mass.). The output of the accelerometers may be integrated twice with respect to time to determine linear motion (along the x, y, and z axes), while the inertial sensor measures changes in the rotational orientation ($\Theta x$, $\Theta y$, and $\Theta z$) of sensor 22, 22'. This information, tied to the time of the measurement, may be stored in memory associated with computer 16, e.g., in the table 32 used to store the photon arrival information, or in a separate table 34 as shown in FIG. 4.

Image Construction

Once all of the desired photon information is collected (e.g., with or without the optional distance, color, and/or orientation information discussed above) it may be used to construct images. Since the present understanding of photography is generally limited to the physical and optical realities that surround conventional camera systems, image construction will now be discussed in terms that proceed from this perspective. When creating an image with a camera several parameters are set in order to ensure that a recorded image is properly exposed, and in focus. These parameters are set as part of the preparation to take the picture. In embodiments of the present invention, however, these parameters are set (and may be repeatedly re-set as desired), as part of the post-data collection image construction.

An exemplary image construction process is described with reference to the following Table II, in conjunction with FIGS. 5-9.

| 210 | Select Time Span |
| 212 | Select Size Of Image Field 40 |
| 214 | Divide Image Field 40 Into Pixels 42 |
| 216 | Optionally Obtain Color Of Each Photon Within Pixel 42 |
| 218 | Aggregate Information For Photons Within Each Pixel 42 |
| 222 | Generate Image Using Aggregated Information |
| 224 | Optionally Adjust Photon Selection Time Span |

| | |
|---|---|
| 226 | Optionally Adjust Photon Placement On The Image Plane 24 |
| 228 | Optionally, Apply Distance-Based Filters |
| 230 | Optionally Apply A Blur Function |
| 232 | Optionally Apply A Lighting Function |
| 234 | Optionally, Apply Photo Enhancement Functions Based On Combination Of Steps 226-232 |

Figure 5:
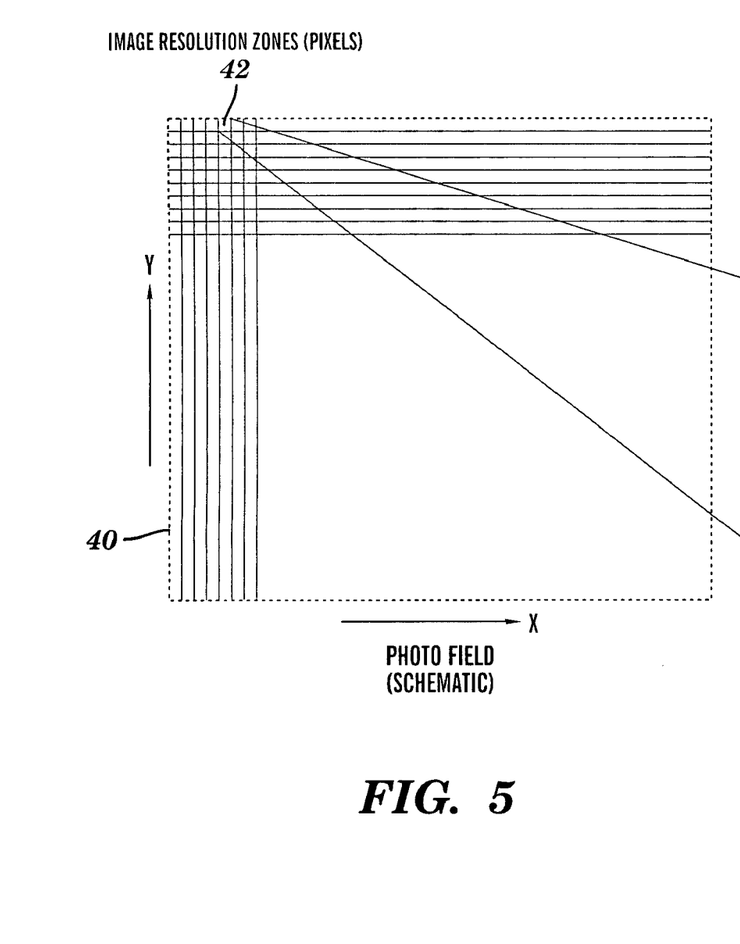
FIG. 5 is a schematic view of a representative image field during a representative operation of the embodiments of FIGS. 1 and 2.

Initially, the time span is selected 210 to define which of the stored photon data will be used. This time span selection is analogous to setting the shutter speed on a conventional camera. The size of the desired image field 40 that will make up the final image is selected at 212, and divided 214 into zones (pixels) 42 as shown in FIG. 5. Each zone 42 represents the smallest image resolution element, or virtual pixel, of the final image. The size of the virtual pixels may be as small as the maximum resolution of the photon sensor 22, 22', or alternatively, may be a coarser grid.

Optionally, the color of each selected photon within a pixel 42 is obtained at 216, e.g., by reference to table 32 (FIG. 4). As mentioned above, in conventional photography there are three spectral intervals, roughly divided as red, green, and blue. Depending on how the initial photon data was captured (e.g., on the number and bandwidth characteristics of the beam splitters 26), these intervals may cover broader or narrower ranges (even including light beyond the visible range), and may be subdivided as finely as the initial data will permit. Each photon (as determined by when and where on image plane 26 (FIG. 3) it was detected), is now given a color value based on which sensors 22' detected any light at a particular time and location on image plane 24. In the embodiments shown and described, a conventional photographic matrix may be used, which includes 3 numbers defining the relative intensity of red, green, and blue in the final pixel. For each photon that falls in that pixel the color matrix will be 1 for the particular sensor 22' it fell on, and therefore the spectral range it lies in, and 2 zeros for the other color ranges, representing the sensors 22' it did not fall on, and, therefore the color ranges it does not belong in.

Figure 6:
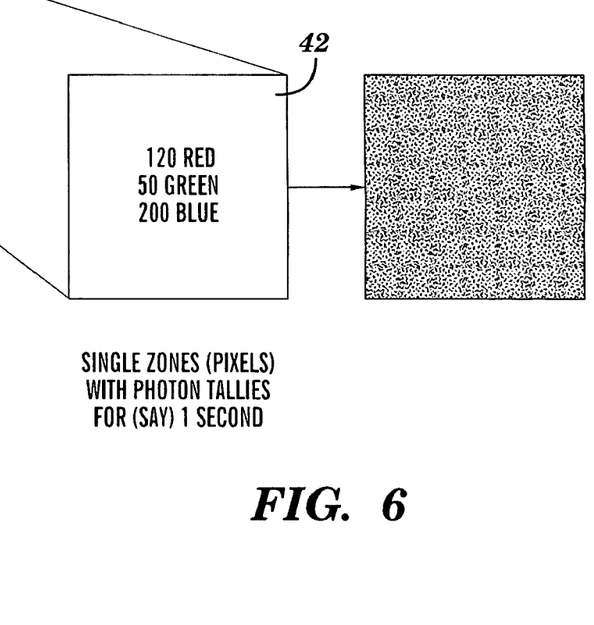
FIG. 6 is an enlarged view of a portion of the image field of FIG. 5.

The information (optionally including all the color matrix information of 216) of particular photons is then aggregated 218 with that of other photons within each particular virtual pixel 42 to determine the brightness (intensity) and color thereof. This aggregation generates a matrix for each virtual pixel, with numbers representing the total intensity of light of a particular color, falling in that virtual pixel. For example, in a photo-like color image there may be 3 numbers per virtual pixel representing intensity of red, green, and blue within the pixel. Each number is traced back to the number of individual photons that fell in that particular virtual pixel on a particular image plane 24, as may be scaled for the particular display medium. As shown in the example of FIG. 6, a pixel having an aggregated matrix of 120 Red, 50 Green, and 200 Blue indicates that 120 Red photons, 50 Green photons, and 200 Blue photons arrived at a particular pixel 42 within a particular time frame.

These matrix numbers may be used to produce 222 an image in any convenient imaging format, such as one of the many standard imaging formats (jpeg, tiff, gif, fits, etc.) or displayed directly on a conventional computer screen or other display. Thus, once the photon data has been drawn from the database, and placed within an image file, it is, essentially, an image, which may be conveniently viewed and printed out in a conventional manner.

Figure 7:
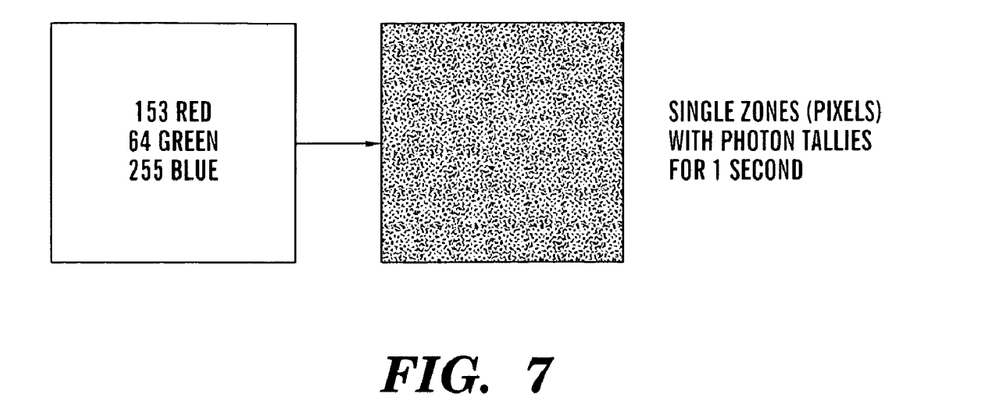
FIGS. 7 and 8 are views similar to that of FIG. 6, during additional, optional operations of the embodiments of FIGS. 1 and 2.
Figure 8:
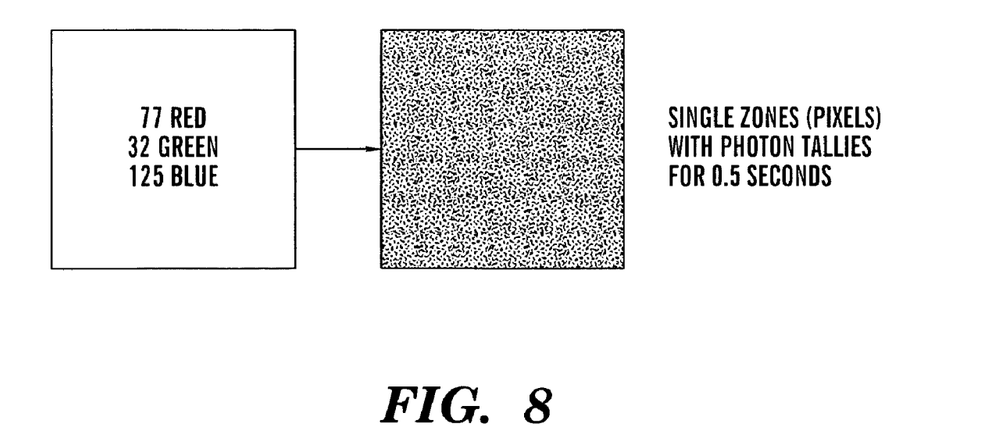

Further steps in the image construction depend on the needs and requirements of the particular situation. For example, the photon selection time span may be adjusted 224, e.g., to improve exposure, as shown in FIGS. 7 and 8. As also mentioned above, embodiments of the present invention enable the photon placement on the image plane 24 to be optionally adjusted 226 to effectively compensate for any undesired movement of sensor 22, 22' that may have occurred during photon/image capture.

Figure 9:
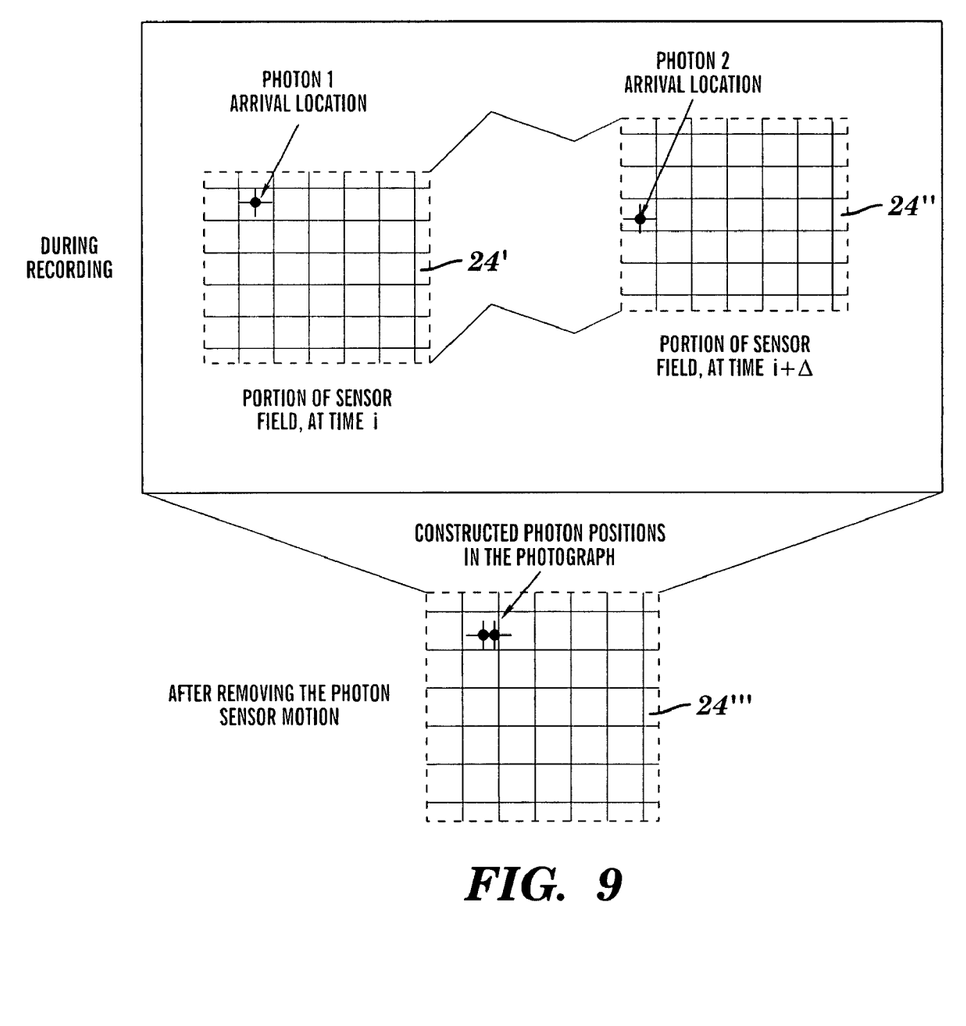
FIG. 9 is diagrammatic view of another optional operation of the embodiments of FIGS. 1 and 2.

For example, as shown in FIG. 9, the movement of sensor 22, 22' occurring between the arrival time (i) of a photon 1 (at image plane 24'), and the arrival time (i+Δ) of a photon 2 (at image plane 24''), may be determined by reference to table 34 for the relevant time period. This camera/sensor movement may then be effectively backed out from the location of the photon 2 (on image plane 24''). The photon 2 may then be placed at the location on the image plane to which it would have arrived, but for this sensor movement, as shown at image plane 24'''.

It should also be noted that since these embodiments do not require a lens, there is no conventional depth of focus information in the captured data. Thus, images generated by the system, without further processing, will inherently have an infinite depth of field. In other words, nominally everything will be in focus, no matter how far away the photon source is from the sensor 22, 22'. However, the distance information (FIG. 4) obtained by use of multiple apertures (e.g., 21, 23) as discussed above, may be used to effectively select and apply a desired focal distance/depth of field ("f-stop") for generated images. For example, distance-based filters may be applied 228 during image construction, e.g., to optionally apply a blur 230 to photons that are not within a particular distance range.

In addition, these distance-based filters may be used to otherwise favor photons of particular distances over those of other distances, such as to optionally apply a lighting function 232. For example, if the lighting on the subject of interest was lower than the background, then photons at the distance of the subject, and/or at the position within image plane 24, 24', 24''' associated with the desired subject, may be favored over photons coming from farther away or elsewhere in the field. This may have the effect of brightening up the desired subject at the expense of the background, or vice versa. In addition, at 234, the aforementioned steps 226-232 may be selectively applied to imitate the effects of particular conventional lens systems. In this way, conventional lens effects such as "panoramic", "fish-eye", and "telephoto", etc. may be imposed on an image. Thus, blur and distortion functions may be arbitrary, and/or tied to substantially any aspect of the photon information, including arrival time, color, location in three dimensions, etc.

It should be understood that any of the features described with respect to one of the embodiments described herein may be similarly applied to any of the other embodiments described herein without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

Having thus described the invention, what is claimed is:

1. An imaging device comprising:
a first aperture associated with a first image plane;
a second aperture associated with a second image plane;
at least one first photon sensor configured to capture arrival of individual photons on the first image plane;

a plurality of second photon sensors configured to capture arrival of individual photons on the second image plane;

the first photon sensor configured to capture arrival locations and arrival times of the individual photons on the first image plane;

the second photon sensors configured to capture arrival locations and arrival times of the individual photons on the second image plane;

the second photon sensors configured to capture colors of the photons on the second image plane;

a stereoptic distance finder configured to identify source distance of image elements common to the first and second image planes;

a processor configured to correlate the identified source distances to photons within the image elements;

a memory configured to store the arrival times and arrival locations on each image plane of each captured photon;

the memory device configured to store the color of each photon on the second image plane;

the memory configured to store the identified source distances of the photons within the image elements;

at least one orientation sensor coupled to at least one of the first and second photon sensors, the orientation sensor configured to capture the orientation of the photon sensor in six degrees of freedom;

an image processor configured to select a time span, identify photons captured within the time span, define an image field, divide the image field into virtual pixels, and aggregate the colors of photons arriving within each virtual pixel within the time frame, to determine a color and intensity of the virtual pixel; and the image processor configured to aggregate the virtual pixels disposed within the image field, to generate an image file of the virtual pixels.

2. The imaging device of claim 1, wherein the image processor is configured to adjust the photons used to generate the image, using a parameter from the group consisting of time span of photon arrival, location of photons within the image planes, captured orientation sensor data, source distance, photon color, and combinations thereof.

3. An imaging device comprising:
an aperture defining an image plane;
at least one photon sensor configured to detect arrival of individual photons on the image plane;
the photon sensor configured to detect arrival locations and arrival times of the individual photons on the image plane;
at least one orientation sensor configured to detect the orientation of the photon sensor;
a processor configured to capture the orientation detected by the orientation sensor, and the arrival locations and arrival times of the photons detected by the photon sensor;
a memory device configured to store the orientation, arrival locations and arrival times;
the processor configured to select a time span, identify photons captured within the time span, define an image field corresponding to the image plane, divide the image field into virtual pixels, and aggregate the photons arriving within each virtual pixel within the time frame, to determine intensity of the virtual pixel; and
the processor being configured to aggregate the virtual pixels disposed within the image field, to generate an image file of the virtual pixels.

4. The imaging device of claim 3, wherein the orientation sensor is configured to capture the orientation of the photon sensor in six degrees of freedom.

5. The imaging device of claim 3, comprising an other aperture defining an other image plane proximate thereto.

6. The imaging device of claim 5, comprising at least one other photon sensor configured to capture arrival of individual photons on the other image plane.

7. The imaging device of claim 6, wherein the photon sensors comprise PAPA cameras.

8. The imaging device of claim 6, wherein the other photon sensor is configured to detect arrival locations and arrival times of the photons on the other image plane.

9. The imaging device of claim 8, wherein the other photon sensor is configured to detect colors of the photons on the other image plane.

10. The imaging device of claim 9, wherein the processor is configured to select a time span, identify photons captured within the time span, define an image field corresponding to the other image plane, divide the image field into virtual pixels, and aggregate the colors of photons arriving within each virtual pixel within the time frame, to determine a color and intensity of the virtual pixel.

11. The imaging device of claim 9, wherein the image processor is configured to adjust the photons used to generate the image, using a parameter from the group consisting of time span of photon arrival, location of photons within the image planes, captured orientation sensor data, source distance, photon color, and combinations thereof.

12. The imaging device of claim 9, wherein the at least one other photon sensor comprises a plurality of other photon sensors disposed to capture mutually distinct colors.

13. The imaging device of claim 12, comprising at least one beam splitter disposed between the other aperture and the plurality of other photon sensors.

14. The imaging device of claim 12, comprising an orientation sensor coupled to at least one of the other photon sensors.

15. The imaging device of claim 9, comprising a stereoptic distance finder configured to identify source distances of image elements detected on both the first and second image planes.

16. The imaging device of claim 15, wherein the processor is configured to correlate the identified source distances to photons within the image elements.

17. The imaging device of claim 16, wherein the memory device is configured to store the color of each photon on the other image plane.

18. The imaging device of claim 17, wherein the memory device is configured to store the identified source distances of the photons within the image elements.

19. A method for imaging, comprising:
(a) detecting, with a photon sensor, arrival locations and arrival times of individual photons on an image plane;
(b) detecting, with at least one orientation sensor coupled to the photon sensor, the orientation of the photon sensor during said detecting (a);
(c) capturing and storing, with a processor and memory, the arrival locations and arrival times of the individual photons;
(d) selecting a time span;
(e) identifying photons captured within the time span;
(f) defining an image field;
(g) dividing the image field into virtual pixels;
(h) aggregating the photons arriving within each virtual pixel within the time frame, to determine intensity of the virtual pixel; and
(i) aggregating the virtual pixels disposed within the image field, to generate an image file of the virtual pixels.

20. The method of claim 19, comprising adjusting the photons used to generate the image, using a parameter from the group consisting of time span of photon arrival, location of photons within the image planes, captured orientation sensor data, source distance, photon color, and combinations thereof.

21. An imaging device comprising:
a first aperture associated with a first image plane;
a second aperture associated with a second image plane;
at least one first photon sensor configured to capture arrival of individual photons on the first image plane;
at least one second photon sensor configured to capture arrival of individual photons on the second image plane;
the first photon sensor configured to capture arrival locations and arrival times of the individual photons on the first image plane;
the second photon sensor configured to capture arrival locations and arrival times of the individual photons on the second image plane;
a stereoptic distance finder configured to identify source distance of image elements common to the first and second image planes;
a processor configured to correlate the identified source distances to photons within the image elements;
a memory configured to store the arrival times and arrival locations on each image plane of each captured photon;
the memory configured to store the identified source distances of the photons within the image elements;
an image processor configured to select a time span, identify photons captured within the time span, define an image field, divide the image field into virtual pixels, and aggregate the colors of photons arriving within each virtual pixel within the time frame, to determine an intensity of the virtual pixel; and
the image processor configured to aggregate the virtual pixels disposed within the image field, to generate an image file of the virtual pixels.

22. The device of claim 21, wherein:
the at least one second photon sensor is configured to detect colors of the photons on the second image plane;
the memory device is configured to store the color of each photon on the second image plane; and
the image processor is configured to determine the color of the virtual pixel.

23. The device of claim 22, comprising at least one orientation sensor coupled to at least one of the first and second photon sensors, the orientation sensor configured to detect the orientation of the photon sensor in six degrees of freedom;
wherein the memory device is configured to store the orientation of the photon sensor, and
the image processor is configured to adjust the photons used to generate the image, using a parameter from the group consisting of time span of photon arrival, location of photons within the image planes, captured orientation sensor data, source distance, photon color, and combinations thereof.

* * * * *